US006839311B1

(12) United States Patent
Yamanoi et al.

(10) Patent No.: US 6,839,311 B1
(45) Date of Patent: Jan. 4, 2005

(54) INFORMATION RECORDING UNIT AND METHOD THEREOF

(75) Inventors: Katsuaki Yamanoi, Saitama (JP); Junichi Yoshio, Saitama (JP); Takayuki Iijima, Saitama (JP); Jun Shinohara, Saitama (JP); Osamu Yoshizawa, Saitama (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/325,418

(22) Filed: Jun. 4, 1999

(30) Foreign Application Priority Data

Jun. 5, 1998 (JP) .......................................... 10-174017

(51) Int. Cl.⁷ ............................................. G11B 19/20
(52) U.S. Cl. ................ 369/53.21; 369/53.1; 369/47.12; 369/52.1; 369/275.3
(58) Field of Search ............................. 369/53.1, 53.21, 369/47.12, 275.3, 47.14, 30.09, 53.42, 53.36, 53.31, 53.17, 53.35, 275.21, 30.21, 44.28, 44.27, 44.34, 53.29, 44.31, 47.11, 53.27, 51.25, 53.2; 360/22, 15, 53, 47, 78.04; 714/6, 770

(56) References Cited

U.S. PATENT DOCUMENTS

| | | | |
|---|---|---|---|
| 4,695,993 A | | 9/1987 | Takagi et al. ............... 369/53.2 |
| 5,233,584 A | | 8/1993 | Kulakowski et al. ..... 369/44.27 |
| 5,291,467 A | * | 3/1994 | Ishiwata et al. .......... 369/30.21 |
| 5,315,578 A | * | 5/1994 | Furukawa ................. 369/275.2 |
| 5,408,478 A | * | 4/1995 | Ohmori et al. ........... 369/53.35 |
| 5,422,761 A | * | 6/1995 | Anderson et al. ............. 360/47 |
| 5,432,922 A | * | 7/1995 | Polyzois et al. ................ 714/6 |
| 5,463,758 A | * | 10/1995 | Ottesen ........................ 711/114 |
| 5,668,789 A | * | 9/1997 | Yokota et al. ............ 369/53.31 |
| 5,793,727 A | * | 8/1998 | Ishibashi et al. .......... 369/53.42 |
| 5,859,815 A | * | 1/1999 | Inoue et al. .............. 369/30.09 |
| 5,887,128 A | * | 3/1999 | Iwasa et al. .................... 714/6 |
| 5,982,729 A | * | 11/1999 | Yamamuro ................ 369/47.14 |
| 6,061,194 A | * | 5/2000 | Bailey .......................... 360/47 |
| 6,163,521 A | | 12/2000 | Konishi et al. ........... 369/275.3 |
| 6,205,099 B1 | * | 3/2001 | Sasaki et al. ............. 369/53.17 |

\* cited by examiner

*Primary Examiner*—William Korzuch
*Assistant Examiner*—Kim-Kwok Chu
(74) *Attorney, Agent, or Firm*—Sughrue Mion, PLLC (57) ABSTRACT

The information recording unit has a memory for firstly storing data, a record medium for intermittently recording the stored data in the memory, a record means for recording the data on the record medium, and a valid-data decision means for determining whether the recorded data is valid. The record means records the data in at least two different areas on the record medium, and the decision determines one valid data among the recorded data in the different areas. The unit includes a record control means for controlling the record means. The record control means provides a control command for the record means to record a predetermined quantity of data stored in the memory at a first recording location on the record medium and also provides a control command for the record means to read the predetermined quantity of the data at least one recording location different from the first recording location after the predetermined quantity of the data is recorded at the first recording location.

12 Claims, 7 Drawing Sheets

PRIOR ART

FIG. 7

| | 16bit | | 16bit | | |
|---|---|---|---|---|---|
| | MSB     LSB | MSB     LSB | MSB     LSB | MSB     LSB | |
| 1 HEADER { | 0 0 0 0 0 0 0 0 | 1 1 1 1 1 1 1 1 | 1 1 1 1 1 1 1 1 | 1 1 1 1 1 1 1 1 | 0 |
| | 1 1 1 1 1 1 1 1 | 1 1 1 1 1 1 1 1 | 1 1 1 1 1 1 1 1 | 1 1 1 1 1 1 1 1 | 1 |
| | 1 1 1 1 1 1 1 1 | 1 1 1 1 1 1 1 1 | 1 1 1 1 1 1 1 1 | 0 0 0 0 0 0 0 0 | 2 |
| | CLUSTER | CLUSTER | 0 0 0 0 0 0 0 0 | 0 0 0 0 0 0 0 0 | 3 |
| | 0 0 0 0 0 0 0 0 | 0 0 0 0 0 0 0 0 | 0 0 0 0 0 0 0 0 | 0 0 0 0 0 0 0 0 | 4 |
| | 0 0 0 0 0 0 0 0 | 0 0 0 0 0 0 0 0 | 0 0 0 0 0 0 0 0 | 0 0 0 0 0 0 0 0 | 5 |
| | | | | | 6 |
| | | | FIRST TNO | LAST TNO | 7 |
| | | | | USED SECTORS | 8 |
| | | | | | 9 |
| | | | | DISC SERIAL NO. | 10 |
| 2 GENERAL DATA OF SEGMENTS { | DISC | ID | P-DFA | P-EMPTY | 11 |
| | P-FRA | P-TN01 | P-TN02 | P-TN03 | 12 |
| | P-TN04 | P-TN05 | P-TN06 | P-TN07 | 13 |
| | P-TN0248 | P-TN0249 | P-TN0250 | P-TN0251 | 74 |
| | P-TN0252 | P-TN0253 | P-TN0254 | P-TN0255 | 75 |
| | | | | | 76 |
| | | | | | 77 |
| 3 CONTROL TABLE (255 SEGMENTS) | (01) START ADDRESS | | | TRACK MODE | 78 |
| | END ADDRESS | | | LINK INFORMATION | 79 |
| | (02) START ADDRESS | | | TRACK MODE | 80 |
| | END ADDRESS | | | LINK INFORMATION | 81 |
| | (03) START ADDRESS | | | TRACK MODE | 82 |
| | END ADDRESS | | | LINK INFORMATION | 83 |
| | (FC) START ADDRESS | | | TRACK MODE | 500 |
| | END ADDRESS | | | LINK INFORMATION | 581 |
| | (FD) START ADDRESS | | | TRACK MODE | 582 |
| | END ADDRESS | | | LINK INFORMATION | 583 |
| | (FE) START ADDRESS | | | TRACK MODE | 584 |
| | END ADDRESS | | | LINK INFORMATION | 585 |
| | (FF) START ADDRESS | | | TRACK MODE | 586 |
| | END ADDRESS | | | LINK INFORMATION | 587 |

INFORMATION RECORDING UNIT AND METHOD THEREOF

BACKGROUND OF THE INVENTION

1. Field of the Invention

The present invention relates to a recording art of audio signals or the like which are read out by various types of reproduction units with fidelity to the original signals, particularly to an information recording unit and method thereof to allow satisfactory recording regardless of the presence of a disturbance like vibration or a defect occurrence on a record medium.

2. Prior Art

Recently, general music or image players having a storage medium such as a disc for readout or record thereof have been produced to be widely used. Particularly, a record and reproduction system incorporating a mini-disc (called MD hereinafter) that is a magneto-optic disc is becoming popular by users. The MD is capable of record and reproduction of music data with ease in the same way as conventional audio cassettes or the like.

To simplify the following description, a record disc unit will be discussed as an example of an audio record mini-disc (MD). However, the present invention including its embodiments described later is generally applicable to various types of discs capable of record of image, data, or the like.

The MD is received in a cartridge in a manner similar to a 3.5 inch floppy disc mounted in a personal computer. The MD is capable of a maximum 74 minute record and reproduction in the same way as a CD (compact disc). The MD adopts a 44.1 kHz sampling frequency with a 16 bit quantized signal like a CD, but utilizes a data compression art called as ATRAC (Adaptive Transform Acoustic Coding) to compress recorded data by 5 to 1.

ATRAC quantizes signals by an A-D conversion like a CD, and the quantized signals are delimited with a predetermined time (the maximum is 11.6 ms) so as to be processed by Fourier transform processing to obtain about a thousand of frequency components (spectrum). The spectrum is separated into some zones based on a human auditory sense characteristic such as a minimum audible limit (each minimum audible level corresponding to each frequency) and a masking effect (a quiet sound is not audible in a loud one). The zones are efficiently marked with codes in consideration of priority thereof.

As discussed above, the record data quantity is reduced to one fifth based-on the human auditory sense characteristic so that MD is not so much inferior to CD in audibility. Such MD having a small disc diameter is presently utilized mainly in portable units as a headphone stereo.

Next, referring to the accompanied drawings, an example of a recording method for audio data or the like in relation to a conventional disc recording unit will be discussed. However, the configuration of the conventional disc recording unit will not be described since it is a most usual information recording unit (well-known unit).

Figure 6:
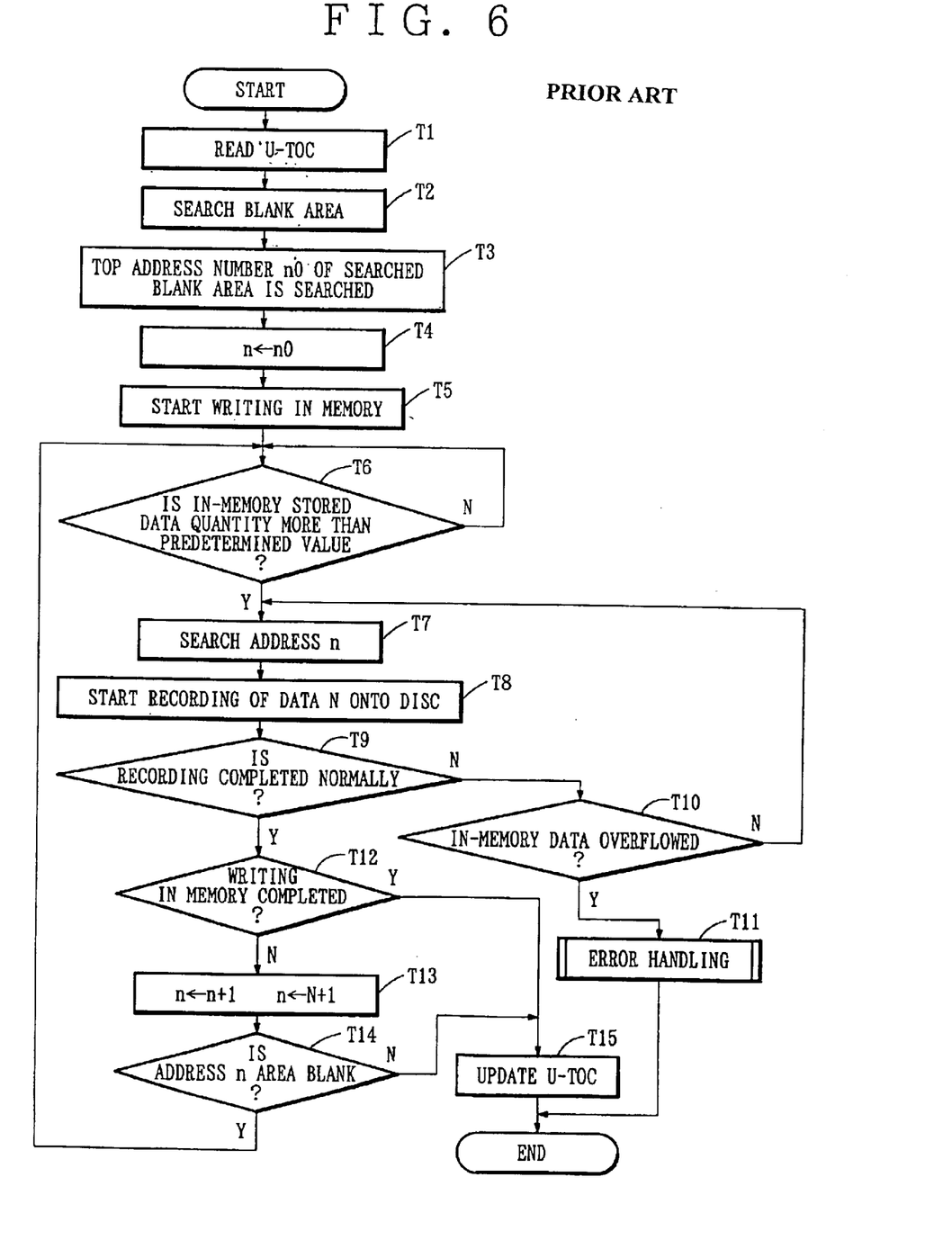
FIGS. 6 is a flowchart showing a recording operation of information like audio data in a conventional information recording unit.

FIG. 6 shows a flowchart of a recording method for audio data or the like in relation to a conventional disc recording unit.

Now, a known MD player will be discussed as one of the conventional information recording units.

As shown in FIG. 6, the information recording unit (MD player) receives a disc in its disc mounting space. According to a user's instruction to record audio data (dubbing), a CPU (not shown) which controls the MD player reads U-TOC information of the mounted mini-disc (step T1). The U-TOC information is stored in a CPU memory. Then, based on the U-TOC information, a blank area (for example, non-recorded area) is searched, and the top address n0 of the searched blank area is found out (steps T2 and T3).

Then, according to the user's instruction, a CD player (compact disc player) performs audio reproduction as an audio providing means. When the MD player starts a recording operation, the CD player outputs reproduction data on the MD.

Meanwhile, the CPU of the MD player sets the top address n0 to a blank area address variable n (step T4).

Then, the MD player converts input data to digital signals by an A-D converter, and an ATRAC encoder 22 compresses the digital signals according to a predetermined compression process to store the signals in the memory (step T5). The storing operation into the memory is continued while the CD player is supplying the data to the MD.

When a remaining data quantity in the MD player memory reaches a predetermined value A, the CPU provides a write command for a record means to record data onto the MD. Meanwhile, when a remaining data quantity in the memory has not reached the predetermined value, writing into the memory is continued (step T6).

According to the read command, a record head and a pickup search an address stored in the address variable n on the mini-disc (step T7) to record a predetermined quantity of data N stored in the memory (step T8). The recording operation is continued until the stored data quantity in the memory reaches the predetermined value.

During recording of the data N from the memory onto the disc (MD), the CPU determines whether the memory is overflowed with data supplied from the CD player due to an unsatisfactory operation such as incomplete focusing or off-tracking (steps T9 and T10).

Where a data overflow condition in the memory is detected, the CPU executes an error handling process (step T11) to forcefully terminate the recording operation. Where no data overflow in the memory is detected, the execution returns to step T7 to record the data N onto the disc again.

On the other hand, during recording the data N from the memory onto the disc (MD), when there is no unsatisfactory operation such as incomplete focusing or off-tracking to normally record the data from the memory onto the disc (MD) and step T9 has detected the normal recording completion of the data N onto the disc, a next step T12 determines whether the user has completed a dubbing operation (including storing into the memory).

After the decision of the dubbing completion, the CPU updates the U-TOC area (step T15) to terminate the recording operation normally. Where step T12 has determined that the user has not completed a dubbing operation, the CPU sets the address variable n to the next address number n+1 (a next data recording start address) and sets the data number N to the next data number N+1 (step T13). Then, it is determined whether the new set address n (=n+1) corresponds to a blank area (step T14).

If the address n (=n+1) does not correspond to a blank area, the U-TOC area is updated (step T15) and the recording operation is forcefully terminated (interruption of dubbing). Where the address n (=n+1) corresponds to a blank area, the execution returns to step T6, and the CPU starts (restart) recording of a new stored data N (=N+1) onto the disc when the remaining data quantity in the memory reaches the predetermined A.

FIG. 7 shows an example of a data arrangement of a U-TOC area in a MD. As illustrated in FIG. 7, on a top position of the U-TOC area, a header is provided. The header has a synchronizing pattern consisting of one-byte data each of which is 0 (zero) or 1 (one) identically. At a predetermined address, data including a first recorded music number (First TNO) 4, a last music number (Last TNO) 5, a U-TOC sector storage condition 6, a disc serial number 7, and a disc ID 8 is recorded. Furthermore, there is provided general data of storing segments 2 corresponding to a later-discussed control table 3 associated with all the recorded music numbers for storing various kinds of table pointers (P-DFA to P-TN0255).

Meanwhile, the controlling table 3 includes 255 rows of segments (01) to (FF). Each segment can record a start address showing a start point of a segment (physically continuing m track), an end address showing the segment end, segment mode information, and a link information indicating start and end addresses of a segment for connecting it to another segment.

That is, the U-TOC area, which is different from a normal music area, records information associated with the whole disc volume.

By the way, as stated above, such MDs having a small disc diameter are presently utilized mainly in portable units such as a headphone stereo. The portable units are subject to an impulsive force due to an abnormal vibration, falling, etc. due to the usage during the transportation thereof. Particularly, MD discs that are storage mediums have a data record surface sensitive to a scratch due to various reasons although they each are received in a cartridge like a 3.5 inch floppy disc.

That is, when recording onto a MD is carried out in a vibration-created environment, for example, a focus error or a tracking error may arise, causing record into an incorrect track (for example, in an adjacent track). Particularly, a wrong record in a track positioned inside the correct track on the disc may cause an undesirable data overweight to lose a correct recorded one.

As described above, the conventional information recording unit has the disadvantage that on recording, a disturbance like vibration may arises, for example, a focus error or a tracking error which may damage data recorded in an adjacent track.
Moreover, a wrong record in a track positioned inside the correct track on the disc may disadvantageously cause an undesirable data overwrite to lose a correct recorded one.

SUMMARY OF THE INVENTION

In view of the aforementioned disadvantages, an object of the present invention is to provide an information recording unit and a method thereof, in which a correct data record is possible, even when the unit is subjected to a disturbance like vibration.

For achieving the object, a first aspect of the present invention is an information recording unit. The unit includes:
 a memory for firstly storing data,
 a record medium for recording the data stored in the memory, the data being recorded in at least two different areas on the record medium, and
 a decision mean for determining one valid data among the recorded data recorded in the different areas.

A second aspect of the present invention is an information recording unit. The unit includes:

a memory for firstly storing data,
 a record medium for intermittently recording the stored data in the memory,
 a record means for recording the data on the record medium, a valid-data decision means for determining whether the recorded data is valid,
 wherein the record means records the data in at least two different areas on the record medium, and the decision determines one valid data among the recorded data in the different areas.

A third aspect of the present invention is dependent on the second aspect of the present invention. The unit further includes a record control means for controlling the record means,
 wherein the record control means provides a control command for the record means to record a predetermined quantity of data stored in the memory at a first recording location on the record medium and also provides a control command for the record means to read the predetermined quantity of data at least a second recording location different from the first recording location after the predetermined quantity of data is recorded at the first recording location.

A fourth aspect of the present invention is dependent on the third aspect of the present invention. The unit further includes a blank area search means for searching a blank area on the record medium,
 wherein the first recording location has a predetermined address of a blank area searched by the blank area search means, and the second recording location has an address different from the predetermined address of the searched blank area.

A fifth aspect of the present invention is dependent on the second aspect of the present invention. The unit further includes a data update means for updating data address information recorded in a control area on the record medium for controlling data addresses, wherein the data update means updates a data address of which data has been decided to be valid by the valid-data decision means.

A sixth aspect of the present invention is dependent on the second aspect of the present invention. The unit further includes:
 a vibration detection means for detecting a vibration applied to the unit,
 a valid-data decision means for determining whether desired data is recorded on the record medium,
 a first storage means for storing a first flag indicating the occurrence of a vibration in relation to a predetermined address when the vibration detection mean has detected a vibration during a data recording operation at the predetermined address, and
 a second storage means for storing a second flag in relation to another predetermined address so as to indicate that the valid-data decision means has determined that desired data is not recorded at the another predetermined address on the record medium,
 wherein the valid-data decision means determines whether the data is valid according to the flags stored by the first and second storage means.

A seventh aspect of the present invention is dependent on the second aspect of the present invention. The unit further includes:
 a servo condition detection means for detecting whether at least one of a tracking error signal and a focus error signal reaches a predetermined threshold, a record-data decision means for determine whether a desired data has been recorded on the record medium, a third storage means for storing a third flag indicating the occurrence of a vibration in relation to a predetermined address during a data recording operation at the predetermined address when the servo condition detection means has detected that the at least one error signal has reached the threshold, a second storage means for storing a second flag corresponding to a predetermined address so as to indicate that the record-data decision means has determined that data is correctly recorded at the predetermined address on the record medium, wherein the valid-data decision means determines whether the data is valid based on the flags stored in the second and third storage means.

An eighth aspect of the present invention is dependent on the fifth aspect of the present invention. Furthermore, the data update means updates a data address in a control area on the record medium so that the data address becomes blank when the valid-data decision means has determined that data corresponding to the data address is not valid.

A ninth aspect of the present invention is dependent on the third aspect of the present invention. Furthermore, the record means continues recording into the first recording location until the remaining data quantity in the memory reaches a predetermined quantity, and continues recording into the second recording location until the record means has recorded data originally identical with the data that has been recorded into the first recording location.

A tenth aspect of the present invention is an information recording method of storing data into a memory firstly and of recording intermittently the in-memory stored data on a record medium. The method includes the steps of:

a first recording step for recording a predetermined quantity of first data at a first recording location on the record medium, a second recording step for recording the first data at one or more locations different from the first recording location on the record medium, a third recording step for recording a predetermined quantity of the second data stored in the memory at a third recording location adjacent to the first recording location on the record medium, a fourth recording step for recording the second data at one or more recording locations adjacent to the recording location in which the first data has been recorded on the record medium in the second recording step, the first to fourth recording steps being repeated to record data stored in the memory on the record medium, a vibration detection step for detecting a disturbing vibration during each of the first to fourth steps, a recorded data decision step for determining whether the first and second data each has been recorded in the corresponding data recording location on the record medium, and a valid-data decision step for determining one valid data among two or more originally identical data recorded in different locations on the record medium based on a result of the vibration detection step during recording of the two or more identical data.

An eleventh aspect of the present invention is an information recording method of storing data into a memory firstly and of recording intermittently the in-memory stored data on a record medium. The method includes the steps of:

a first recording step for recording a predetermined quantity of first data at a first recording location on the record medium, a second recording step for recording the first data at one or more locations different from the first recording location on the record medium, a third recording step for recording a predetermined quantity of the second data stored in the memory at a third recording location adjacent to the first recording location on the record medium, a fourth recording step for recording the second data at one or more recording locations adjacent to the recording location in which the first data has been recorded on the record medium in the second recording step, the first to fourth recording steps being repeated to record data stored in the memory on the record medium, a servo condition detection step for detecting whether at least one of a tracking error signal and a focus error signal reaches a predetermined threshold during each of the first to fourth recording steps, a record-data decision step for determining whether the first and second data each has been recorded in the associated data recording location on the record medium, and a valid-data decision step for determining one valid data among two or more originally identical data recorded in different locations on the record medium based on a result of the servo condition detection step during recording the two or more identical data.

A twelfth aspect of the present invention is dependent on the tenth aspect of the present invention. The method further includes a data updating step for updating data address information recorded in a control area on the record medium to control a data address based on a result of the valid data decision step.

Now, an advantageous effect of the present invention will be discussed. In the information recording units according to the present invention, the originally identical data is stored in two or more physically apart areas. Since one of the plural data is used as valid data, a normal record onto the record medium is allowed even in the event of track jumping due to an abnormal disturbance like vibration.

BRIEF DESCRIPTION OF THE DRAWINGS

FIG. 7 is a diagram showing an example of a data arrangement of a U-TOC area.

DETAILED DESCRIPTION OF THE PREFERRED EMBODIMENTS

Referring to the accompanied drawings, embodiments of the present invention will be discussed hereinafter.

Figure 1:
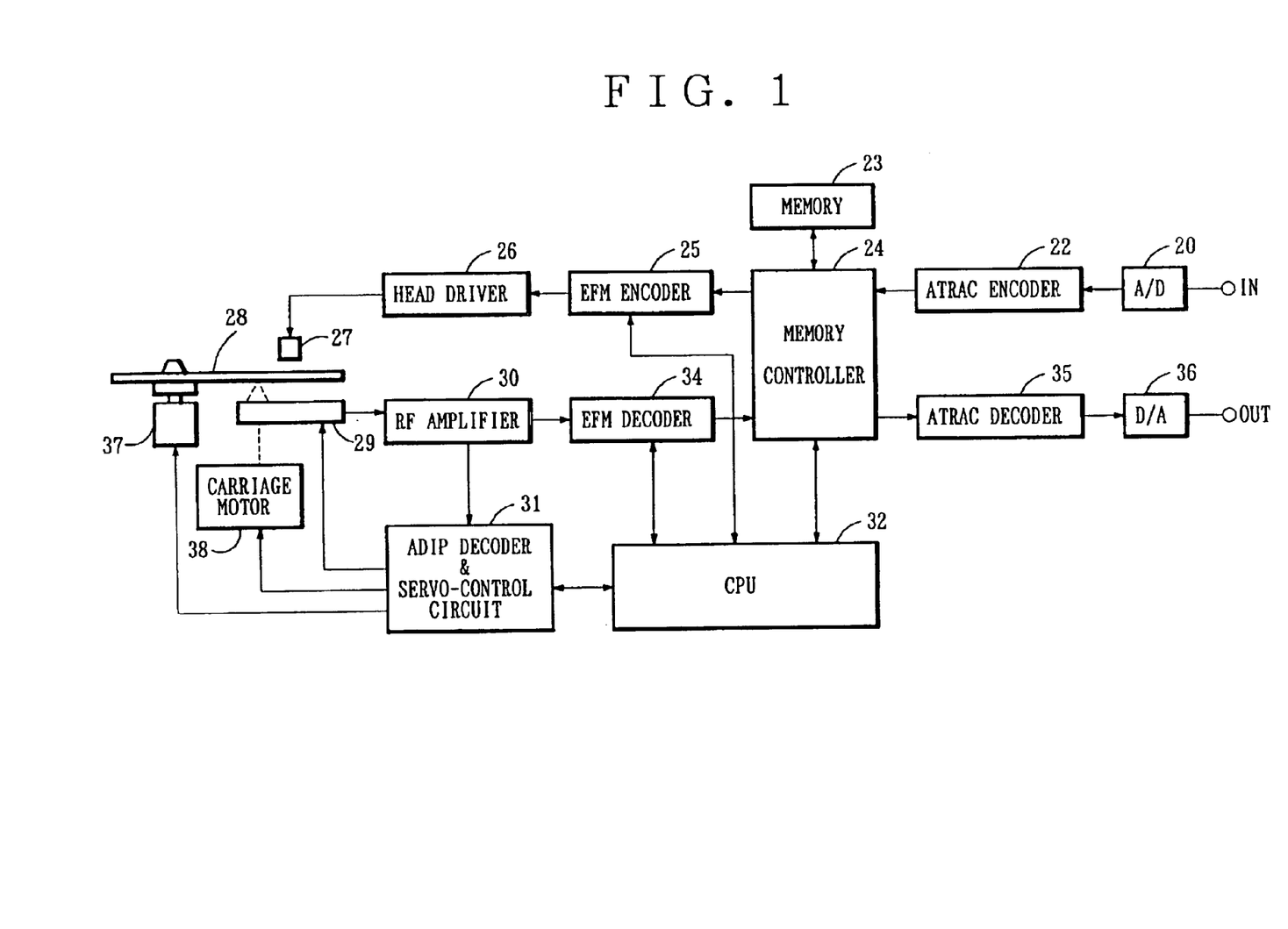
FIG. 1 is a block diagram showing a configuration of an information recording unit according to the present invention.

FIG. 1 is a block diagram showing a configuration of a MD player according to the present invention.

In FIG. 1, an ATRAC encoder 22 receives digital audio signals through an A-D the converter 20 from an audio signal supply means (not shown) such as a CD player or a radio. The ATRAC encoder 22 compresses every block of digital audio signals supplied in time sequence by an audio compression art called ATRAC. The ATRAC encoder 22 is connected to a memory controller 24 which controls writing and readout of a RAM memory 23 that is a shock proof memory. The compressed digital audio signals are written in the memory 23 once to be read out in the written sequence.

BY the encoder 25, the digital audio signals read out from the memory 23 are modulated in an EFM modulation process (eight-to-fourteen modulation) and are corrected in an error correction process such as CIRC (Cross Interleave Reed-Solomon code). Then, the modulated signals are supplied to a head driver circuit 26. The head driver circuit 26 drives a record head 27 according to the signals supplied from the EFM encoder 25. The record head 27 applies a magnet field on a storage medium that is a MD (also called a mini-disc hereinafter) 28.

On recording, an optical pickup 29 radiates a laser beam on a surface of the mini-disc 28, on the other side of which a magnetic field is applied. In a portion heated up to a high temperature by the laser beam (actually, on a predetermined continuous track), the signals (magnetic fields) supplied from the head 27 are recorded.

On reading, the optical pickup 29, which is a read means, radiates a laser beam to read the recorded signals. The optical pickup 29 has a light receiving element to receive a reflection light from the mini-disc 28. The optical pickup 29 outputs signals corresponding to the received light quantity to a RF amplifier 30. RF amplifier 30 amplifies the signals received from the optical pickup 29 to generate various kinds of signals required for servo operations and signals (WBO) provided for address reading (ADIP).

RF amplifier 30 is connected to an ADIP decoder and a servo-control circuit 31. The ADIP decoder and servo-control circuit 31 operate according to a command from a CPU 32. Control of the ADIP decoder and servo-control circuit 31 includes a spindle servo for rotating the disc in synchronization with reference signals according to servo signals supplied from the amplifier 30 that receives signals from the optical pickup, a tracking (TRKG) servo for modifying an angle of a mirror according to the off-centering of the disc so that the laser beam always tracks one signal track, a focusing (FOCUS) servo for correctly positioning an objective lens to follow the vertical disc swing during rotation of the disc to focus the beam in a pit of the disc, and a carriage servo for moving the optical pickup 29 in a radial direction of the disc 28. The ADIP decoder takes address signals from WBO produced in the RF amplifier 30.

The mini-disc 28 is rotated by a spindle motor 37 included in the spindle servo system, and the optical pickup 29 is moved by a carriage motor 38 included in the carriage servo system.

On reproduction, the optical signals are received by the optical pickup 29 to be read-out signals which are supplied to an EFM decoder 34 by way of the RF amplifier 30. The EFM decoder 34 corrects errors in the read-out signals according to a CIRC process and demodulates the read-out signals in an EFM modulation. Then, the demodulated signals are supplied to a memory controller 24.

The memory controller 24 controls the writing of the read-out data into the memory 23 on reading. In addition, the controller 24 reads data stored in the memory 23 at a speed lower than that the writing. The stored data is deleted from the memory 23 but is supplied to an ATRAC (Adaptive Transform Acoustic Cording) decoder 35.

The ATRAC decoder 35 demodulates digital audio signals compressed by an ATRAC audio compression process. The digital audio signals processed by the ATRAC decoder 35 are supplied to a D-A converter 36 to be converted into analog audio output signals. In addition, the memory controller 24, the EFM encoder 25, and the EFM decoder 34 each are controlled by the CPU 32. According to a main feature of the present invention, the CPU 32 also controls a data recording operation and a valid-data decision means which determines valid data from recorded data.

Figure 2:
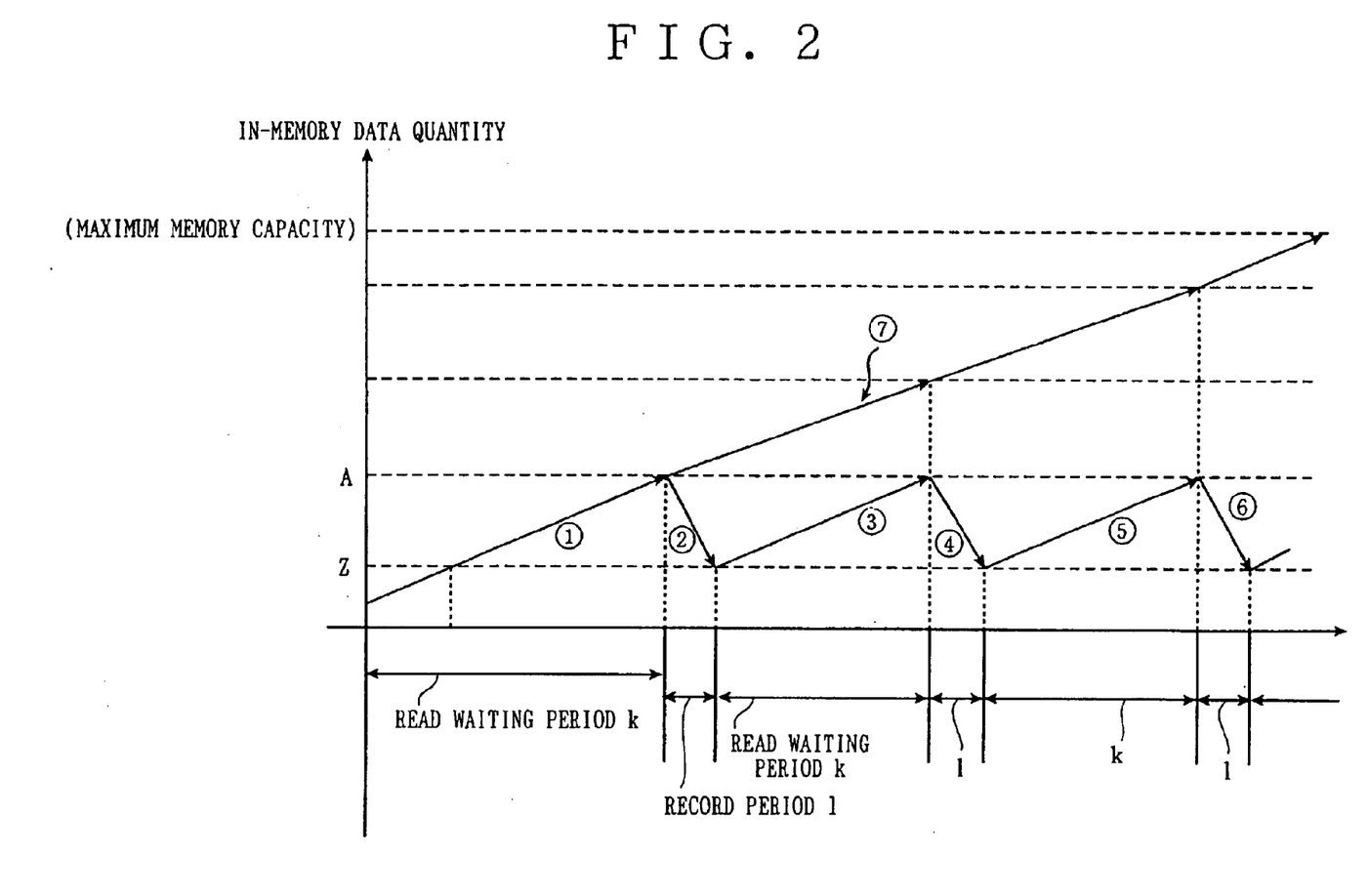
FIG. 2 is a graphic illustration showing an example of timing of data reading/writing of a memory and a disc (MD) during recording of a mini-disc player.

FIG. 2 shows a remaining data quantity in the memory 23 on recording of the mini-disc player, in which a vertical coordinate indicates a remaining data quantity in the memory and a horizontal coordinate is a time axis.

As illustrated in FIG. 2, on recording, an audio producing means (not shown) provides analogue audio signals into the MD player. The supplied audio signals are converted into digital audio signals by the A-D converter 20. The digital signals are compressed by the ATRAC encoder by a predetermined quantity unit thereof to be stored in the memory 23 (circled numeral 1: record waiting period k).

The memory controller 24 mounted in the MD player monitors the remaining data quantity in memory 23 and sends a control signal to CPU 32 when the remaining data quantity reaches a predetermined value A. CPU 32 provides a record command to a record means including record head 27 and pickup 29 according to the control signal.

The record means that has received the record command records sequentially data in memory 23 onto the MD.

With recording onto the disc, the remaining data quantity in memory 23 decreases gradually (circled numeral 2: recording period 1). The memory controller 24 outputs a control signal to CPU 32 when the remaining data quantity reaches a predetermined value Z. CPU 32 provides a record waiting command to a record means including record head 27 and pickup 29 according to the control signal.

The record means that has received the waiting command interrupts recording of the data stored in the memory 23 onto the MD.

During the record waiting period, the data stored in the memory 23 increases gradually (circled numeral 3: record waiting period k). When the remaining data quantity in the memory reaches the predetermined value A, the memory controller 24 provides a control signal again to CPU 32.

Thereafter, based on the remaining data quantity in the memory, recording operations (circled numerals 2, 4, 6: recording period k) and record waiting periods (circled numerals 1, 3, 5: record waiting period 1) are repeated.

During the recording operation, if the recording is interrupted due to a disturbance like vibration, data increases gradually in the memory 23. For example, the recording interruption (circled numeral 2) causes an increase of the data quantity in the memory (circled numeral 7).

In addition, during a data increasing period (circled numeral 7), if recording becomes allowable, a recording operation restarts.

On the other hand, if a recording operation has not been allowed until the remaining data quantity in the memory reaches the maximum memory capacity M, the recording is terminated.

As previously described, based on the remaining data quantity in the memory, the data is recorded onto the MD.

Figure 3:
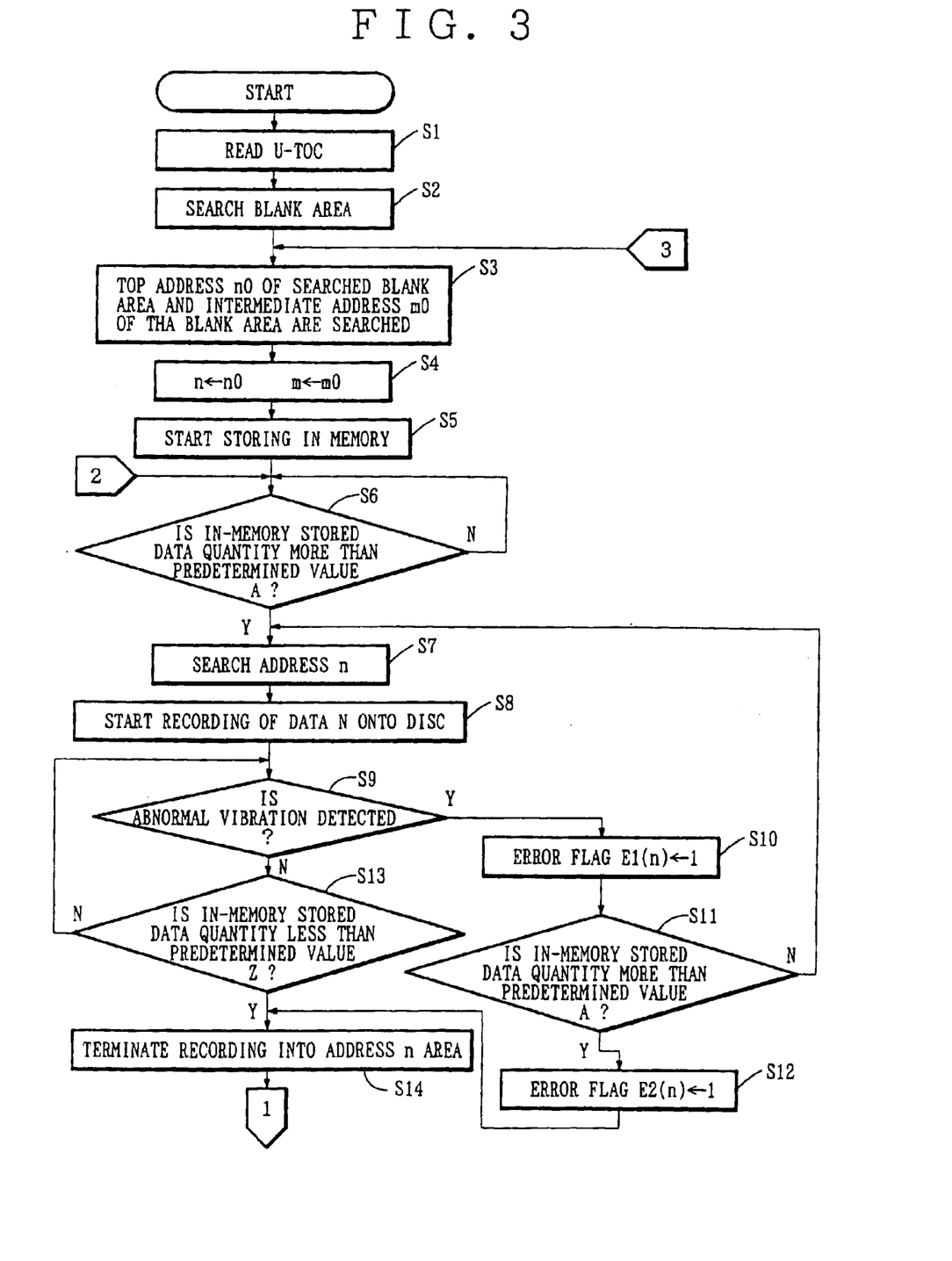
FIGS. 3 to 5 are flowcharts showing a backup track control of an information recording unit according to the present invention.
Figure 4:
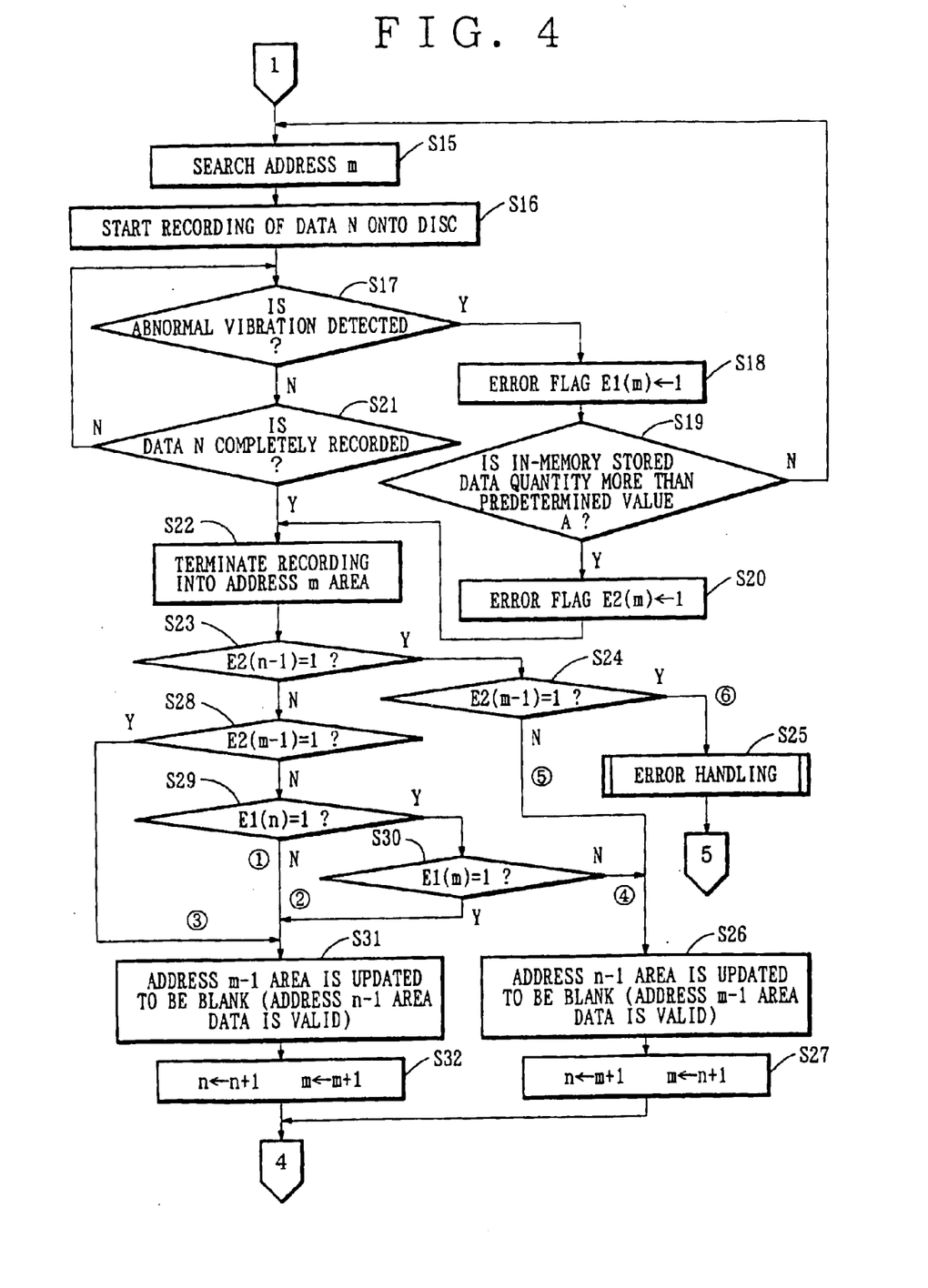
Figure 5:
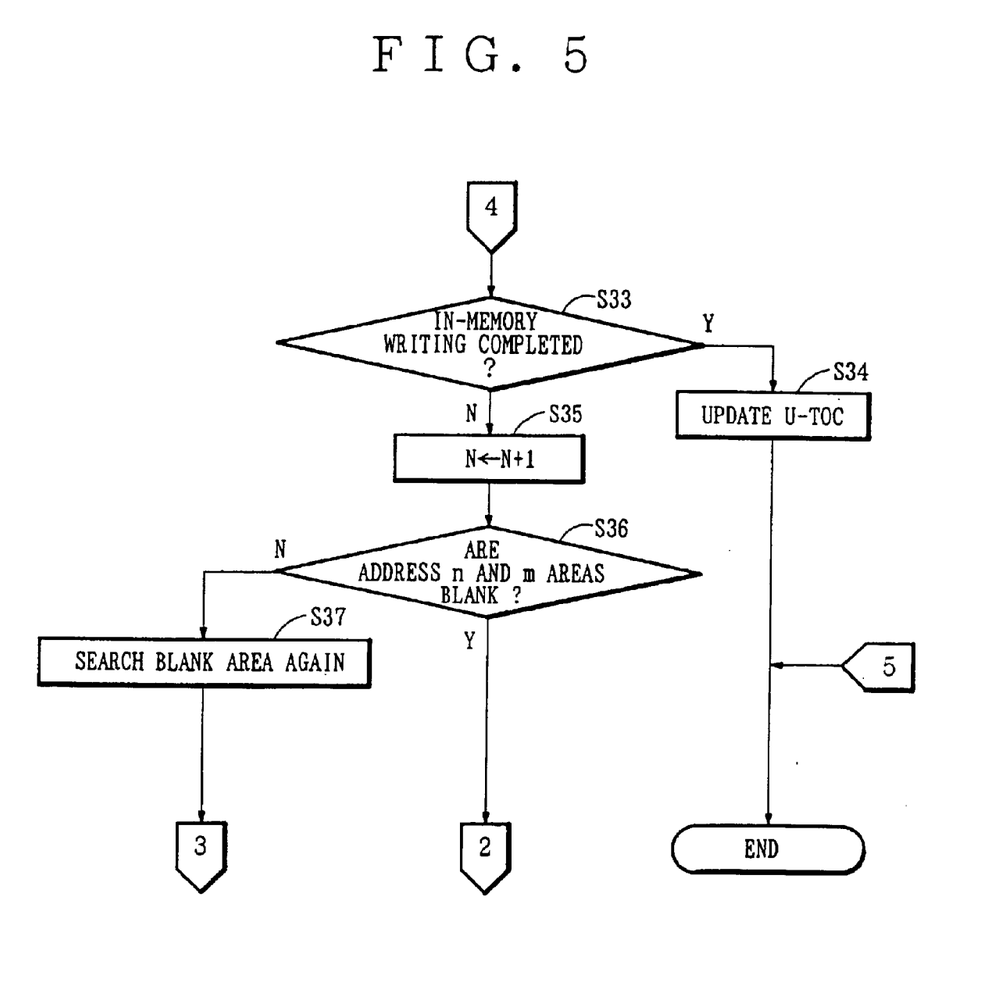

Next, referring to FIGS. 3 to 5, an information recording method related to the information recording unit according to the present invention will be discussed in detail. FIGS. 3 to 5 show flowcharts related to an embodiment of the present invention.

To describe the present invention, a data recording operation onto a mini-disc 28 mounted in a MD player will be discussed hereinafter. The data is reproduced to be supplied by, for example, a CD (compact disc) player.

First, the information recording unit according to the present invention receives the mini-disc 28. Then, CPU 32 reads U-TOC information of the mounted mini-disc 28 (step S1). The read U-TOC information are stored in a CPU memory (not shown). Then, based on the U-TOC information, a blank area (for example, non-recorded area) is searched, and the top address n0 of the searched blank area with an intermediate address m0 of the blank area is found out (steps S2 and S3).

Normal Recording Process

Then, according to a user's instruction, the CD player performs audio reproduction as an audio reproduction means. When the MD player starts a recording operation, the CD player outputs reproduction data into the MD player.

Meanwhile, the CPU of the MD player sets the top address n0 of a blank area to n and sets the intermediate address m0 to m (step S4).

Then, the MD player converts input data to digital audio signals by an A-D converter 20, and an ATRAC encoder 22 compresses the digital signals according to a predetermined compression process to store the signals in the memory (step S5). The storing operation into the memory 23 is continued while the CD player is supplying the data to the MD.

When a remaining data quantity in the MD player memory 23 reaches the predetermined value A (see FIG. 2), the CPU 32 supplies a record command to a record means to record data onto the MD. Meanwhile, when a remaining data quantity in the memory 23 has not reached the predetermined value, writing into the memory 23 is continued (step S6).

According to the read command, a record head 27 and a pickup 29 searches an address stored in an address indicating variable n on the mini-disc (step S7) to record a predetermined quantity of data N stored in the memory 23 (step S8). The recording operation is continued until the stored data quantity in the memory 23 reaches the predetermined value Z, since the quantity of data N corresponds to a differential between the predetermined values A and Z of FIG. 2.

In addition, a predetermined quantity of data (for example, the data N) may be stored firstly in another memory (not shown) other than the memory 23 of FIG. 2, and the predetermined quantity of data is deleted after recorded onto an address m area which will be described later. The predetermined quantity of data may be stored in the memory 23 until it has been completely recorded onto the address m area.

During recording of the data N, it is determined whether a vibration sensor (not shown) has detected an abnormal state (step S9). When the decision is that there has been no abnormal state, a next step 13 is executed. The abnormal vibration detection is performed while servo systems for recording are working.

In addition, when the decision results in that there has been detected a abnormal state, an error flag E1(n) is set to 1 (one). The error flag including the associated address n is stored in a memory (not shown) of CPU 32 (step S10).

A next step S11 determines whether a stored data quantity in the memory 23 has reached the predetermined value A (see FIG. 2). When the data quantity has not reached the value A, the originally identical data is recorded again in an address n area. In addition, where no abnormal vibration is detected during recording of the originally identical data and the decision of step S9 is that there has been detected no abnormal state, the error flag E1(n) remains 1 (one).

On the other hand, where the stored data quantity in the memory 23 has not reached the predetermined value A, an error flag E2(n) is set to 1 (one). The error flag including the associated address n is stored in a memory (not shown) of CPU 32 (step S12). In a step S13, it is determined whether a stored data quantity in the memory 23 becomes not more than the predetermined value Z. When the data quantity has not reached the value Z, the returns to step S9. When the data quantity has reached the value Z, a next step S14 terminates recording into the address n area.

By the forgoing steps, a predetermined quantity of data N is stored in the address n area. In addition, where no error flag is set in the foregoing steps, it shows that data has been normally recorded without receiving an abnormal vibration. On the other hand, where an error flag E1(n) is set to 1, it shows that data has been recorded in an address n area although an abnormal state has occurred due to a disturbance like vibration (adjacent data may have been possibly damaged). Furthermore, when an error flag E1(n) and an error flag E2(n) each have been set to 1, it shows that data has not been recorded in an address n area.

Record Waiting Period

Next, operation in a record waiting period will be discussed.

According to the present invention, a recording operation is executed during the waiting period, which is different from the record waiting period previously described in the prior art.

In the first place, CPU 32 provides a command to a record means so as to record the originally identical data (data N), which has been recorded in the address n area, in the intermediate address area that has become blank in step S4.

According to the command, the record head 27 and the pickup 29 search an address stored in an address variable m (step S15) to record a predetermined quantity of data N (having address n) stored in a not-shown memory (step S16). The recording operation is continued until the predetermined quantity of data N has been completely recorded.

During recording of the data N, it is determined whether there has been detected an abnormal state due to vibration or the like (step S17). Where the decision results in no abnormal state detection, a next step 21 is executed.

On the other hand, where the decision results in that there has been an abnormal state detection, an error flag E1 (m) is set to 1 (one). The error flag is stored together with the associated address m in a memory (not shown) mounted in CPU 32 (step S18)

Next, a next step S19 determines whether a stored data quantity in the memory 23 has reached the predetermined value A (see FIG. 2). When the data quantity has not reached the value A, the originally identical data is recorded again in the address m area. On recording of the identical data, where step 17 has determined that there has been detected an abnormal state due to vibration, the error flag E1(m) remains 1 (one).

On the other hand, where a stored data quantity in the memory 23 has reached the predetermined value A, an error flag E2(m) is set to 1 (one). The error flag including the associated address m is stored in a memory (not shown) of CPU 32 (step S20), and a next step 22 terminates recording into an address m area.

In a step S21, itis determined whether recording of data N from the not-shown memory has been completed. When it is not completed, recording of data N is continued and the execution returns to step 17. When it is completed, a next step S22 terminates recording into the address m area.

By the above-mentioned steps, the data N is stored in the address m area. In addition, where no error flag is set in the steps, it shows that data has been normally recorded without an abnormal vibration. On the other hand, where an error flag E1($m$) is set to 1, it shows that data has been recorded in an address m area although an abnormal state has occurred due to a disturbance like a vibration (adjacent data may have been possibly damaged). Furthermore, when error flag E1($m$) and error flag E2($m$) each have been set to 1, it shows that data has not been recorded in an address m area.

Valid-record Decision Process

Next, a valid-record decision process is executed. In the process, a valid data is determined from the originally identical data stored in the address n area and the address m area. More specifically, in the present invention, a valid-record decision process determines whether the immediately preceding data recorded in the address n–1 and m–1 areas is valid after recording into the address n and m areas has completed.

(1) For cases where data has been recorded in the address n–1 and m–1 areas and valid data has been recorded in the address n area (without detecting an abnormal vibration):

First, since data has been also recorded in the address n–1 area, an error flag has not been set in E2, so that E2($n$–1) is not 1 (in step s23). Next, since data has been recorded in the address m–1 area, an error flag has not been set in E2, so that E2($m$–1) is not 1 (in step S28). Next, since data has been normally recorded in the address n area (without detecting an abnormal vibration), an error flag has not been set in E1, so that E1($n$) is not 1 (in step S29). The step 29 determines whether the data in the address n area adjacent to the address n–1 area is recorded without an abnormal vibration. When the data in the address n is recorded without an abnormal vibration, at least the data recorded in the adjacent address n–1 area is considered to be valid data which has not been incorrectly recorded (or overwritten) due to an abnormal vibration.

Accordingly, the normal data recorded in the address n–1 area is remained, and the address m–1 area is updated to be blank (step S31).

(2) For cases where data has been recorded in the address n–1 and m–1 areas and an abnormal vibration is detected during recording in the address n and m areas:

First, since data has been also recorded in the address n–1 area, an error flag has not been set in E2, so that E2($n$–1) is not 1 (in step S23). Next, since data has been recorded also in the address m–1 area, an error flag is not set in E2, that is, E2($m$–1) is not 1 (in step S28).

Next, since an abnormal vibration has been detected during recording into the address n area, E1($n$) is set to 1 (in step S29). Furthermore, since an abnormal vibration has been also detected during recording into the address m area, E1($m$) has been set to 1 (in step S30). Accordingly, the normal data recorded in the address n–1 area is remained, and the address m–1 area is updated to be blank (step S31).

(3) For cases where data is recorded in the address n–1 area and data is not recorded in the address m–1 area:

First, since data has been also recorded in the address n–1 area, an error flag has not been set in E2, so that E2($n$–1) is not 1 (in step S23). Next, since data has not been recorded in the address m–1 area, an error flag has been set in E2, so that E2($m$–1) is 1 (in step S28).

Accordingly, the normal data recorded only in the address n–1 area is remained, and the address m–1 area is updated to be blank (step S31).

(4) For cases where data has been recorded in the address n–1 and m–1 areas and an abnormal vibration is detected during recording data into the address n area and data has been normally recorded in the address m area (without detecting an abnormal vibration):

First, since data has been also recorded in the address n–1 area and an error flag has not been set in E2, E2($n$–1) is not 1 (in step S23). Next, since data has been recorded also in the address m–1 area, an error flag has not been set in E2, so that E2($m$–1) is not 1 (in step S28). Next, since an abnormal vibration has been detected during recording into the address n area, E1($n$) has been set to 1 so that E1($n$) is (in step S29). Furthermore, since no abnormal vibration has been detected during recording into the address m area, E1($m$) is not 1 (in step S30). Accordingly, the normal data recorded in the address m–1 area is remained, and the address n–1 area is updated to be blank (step S26).

(5) For cases where data has not been recorded in the address n–1 area and data has been recorded in the address m–1 area:

First, since data has been also recorded in the address n–1 area, an error flag has been set in E2, so that E2($n$–1) is 1 (in step S23). Next, since data has been recorded in the address m–1 area, an error flag has not been set in E2, so that E2($m$–1) is not 1 (in step S24).

Accordingly, the data recorded only in the address m–1 area is remained, and the address n–1 area is updated to be blank (step S26).

(6) For cases where data has not been recorded in the address n–1 and m–1 areas:

First, since data has not been recorded in the address n–1 area, an error flag has been set in E2, so that E2($n$–1) is 1 (in step S23). Next, since data has not been recorded also in the address m–1 area, an error flag has been set in E2, so that E2($m$–1) is 1 (in step S24).

Accordingly, since data has not been recorded in the address n–1 and m–1 areas, the recording operation is terminated (step S25).

Through the foregoing steps, valid data is remained.

Next, in a step S31, when data in the address n–1 area is remained, an address variable n is set to n+1 and an address variable m is set to m+1 (step S32).

Meanwhile, in step S26, when data in the address m–1 area is remained, an address variable n is set to m+1 and an address variable m is set to n+1 (step S27).

In these steps, it is considered that adjacent data is continuously recorded. However, the continuos recording is not required always.

After a next address setting step, it is determined whether the recording is completed (step S33). When completed, data stored in the U-TOC information is updated (step S34).

Meanwhile, when recording is not terminated, the data number N is set to N+1 (step S35), and it is determined whether next recording areas having addresses n and m are blank or not (step S36). When both those areas are determined to be blank, the recording operation is continued (step S6).

Meanwhile, when the both areas are not blank, a blank area is searched again based on the U-TOC information and the blank area addresses set in steps S26, 31 (step S37). Then, the process goes to step S3.

As discussed above, by recording the originally identical data in different areas physically apart from each other (in different addresses), the valid-data decision means can provides a satisfactory decision.

In the embodiment, the originally identical data is recorded two times. However, the originally identical data may be recorded more times as far as during a record waiting period, in which the valid-data decision means is appropriately modified in a decision process.

Furthermore, in the embodiment, the record waiting period and the record timing are determined according to the remaining data quantity in the memory. Alternatively, a predetermined quantity of data may be recorded when another predetermined quantity of data (for example, one cluster of data in a MD) has been stored.

Moreover, in the embodiment, the address m area is positioned in an intermediate part of the blank area. Alternatively, the address m area may be positioned in an area other than the address n area.

In the step S9 decision, a condition of a servo such as a focus servo may be determined. Step 9 results in "N" (NO) when the servo condition is wrong. For the decision, a focus error signal or a tracking error signal may be monitored in amplitude.

Additionally, in the error handling process in step S25, the recording operation is terminated as previously described. Alternatively, step S25 may terminate the recording operation, for example, after it is determined that the data up to the address n−2 area is valid and the U-TOC information is updated. In addition, one of the address n−1 and m−1 areas may be intentionally selected once to continue a next recording operation (step S31 or S26). Alternatively, one of the address n−1 and m−1 areas may be set to be blank to continue a next recording operation.

What is claimed is:

1. An information recording unit comprising:
   a memory for firstly storing data,
   a record medium for intermittently recording the stored data in said memory,
   a record device for recording the data on said record medium,
   a valid-data decision device for determining whether the recorded data is valid,
   wherein said record device records the data in at least two different areas on said record medium, and said valid-data decision device determines one valid data among the recorded data of the different areas,
   a vibration detection device for detecting a vibration applied to the unit,
   a first storage device for storing a first flag indicating the occurrence of a vibration in relation to a predetermined address when said vibration detection device has detected a vibration during a data recording operation at the predetermined address, and
   a second storage for storing a second flag in relation to another predetermined address so as to indicate that said valid-data decision device has determined that desired data is not recorded at the another predetermined address on said record medium,
   wherein said valid-data decision device determines whether the data is valid according to said flags stored by said first and second storage devices.

2. An information recording unit comprising:
   a memory for firstly storing data,
   a record medium for intermittently recording the stored data in said memory,
   a record device for recording the data on said record medium,
   a valid-data decision device for determining whether the recorded data is valid,
   wherein said record device records the data in at least two different areas on said record medium, and said valid-data decision device determines one valid data among the recorded data of the different areas,
   a servo condition detection device for detecting whether at least one of a tracking error signal and a focus error signal reaches a predetermined threshold,
   a record-data decision device for determining whether a desired data has been recorded on said record medium,
   a first storage device for storing a first flag indicating the occurrence of a vibration in relation to a predetermined address during a data recording operation at the predetermined address when said servo condition detection device has detected that said at least one error signal has reached the threshold,
   a second storage device for storing a second flag corresponding to a predetermined address so as to indicate that said record-data decision device has determined that data is correctly recorded at the predetermined address on said record medium,
   wherein said valid-data decision device determines whether the data is valid based on said flags in said first and second storage devices.

3. An information recording method of storing data into a memory firstly and of recording intermittently the in-memory stored data on a record medium, the method comprising the steps of:
   a first recording step for recording a predetermined quantity of first data at a first recording location on said record medium,
   a second recording step for recording the first data at one or more locations different from the first recording location on the record medium,
   a third recording step for recording a predetermined quantity of the second data stored in said memory at a third recording location adjacent to the first recording location on the record medium,
   a fourth recording step for recording the second data at one or more recording locations adjacent to the recording location in which the first data has been recorded on said record medium in the second recording step, the first to fourth recording steps being repeated to record data stored in said memory on said record medium,
   a vibration detection step for detecting a disturbing vibration during each of the first to fourth steps,
   a recorded data decision step for determining whether the first and second data each has been recorded in the corresponding data recording location on said record medium, and
   a valid-data decision step for determining one valid data among two or more originally identical data recorded in different locations on said record medium based on a result of said vibration detection step during recording of the two or more identical data.

4. The method as set forth in claim 3, the method further comprising a data updating step for updating data address information recorded in a control area on the record medium to control a data address based on a result of said valid-data decision step.

5. An information recording method of storing data into a memory firstly and of recording intermittently the in-memory stored data on a record medium, the method comprising the steps of:
   a first recording step for recording a predetermined quantity of first data at a first recording location on said record medium,
   a second recording step for recording the first data at one or more locations different from the first recording location on the record medium, a third recording step for recording a predetermined quantity of the second data stored in said memory at a third recording location adjacent to the first recording location on the record medium, a fourth recording step for recording the second data at one or more recording locations adjacent to the recording location in which the first data has been recorded on said record medium in the second recording step, the first to fourth recording steps being repeated to record data stored in said memory on said record medium, a servo condition detection step for detecting whether at least one of a tracking error signal and a focus error signal reaches a predetermined threshold during each of the first to fourth recording steps, a record-data decision step for determining whether the first and second data each has been recorded in the associated data recording location on said record medium, and a valid-data decision step for determining one valid data among two or more originally identical data recording in different locations on said record medium based on a result of said servo condition detection step during recording the two or more identical data.

6. The method as set forth in claim 5, the method further comprising a data update step for updating data address information recorded in a control area on the record medium to control data address based on a result of said valid-data decision step.

7. A method of storing data into a memory and recording the stored data on a record medium, comprising:

recording a predetermined quantity of first data at a first recording location on said record medium, recording the first data at least a second recording location on the record medium, wherein the at least the second recording location is different from the first recording location, recording a predetermined quantity of second data stored in said memory at a third recording location on a record medium, recording the second data at one or more recording locations adjacent to the recording location on said record medium, the four recording operations being repeated to record data stored in said memory on said record medium, detecting a disturbing vibration during each of the four recording operations, deciding whether the first and second data each has been recorded in the corresponding data recording location on said record medium, and determining one valid data among two or more originally identical data recorded in different locations on said record medium based on a result of said detecting operation during recording of the two or more identical data.

8. The method as set forth in claim 7, the method further comprising:

updating data address information recorded in a control area on the record medium to control a data address based on a result of said determining operation.

9. A method of storing data into a memory and recording the stored data on a record medium, comprising:

recording a predetermined quantity of first data at a first recording location on said record medium, recording the first data at least a second recording location on the record medium, wherein the at least the second recording location is different from the first recording location on the record medium, recording a predetermined quantity of second data stored in said memory at a third recording location on the record medium, which is different from the first and second recording locations, recording the second data at one or more recording locations different from the recording locations in which the first data has been recorded on said record medium, said four recording operations being repeated to record data stored in said memory on said record medium, detecting whether at least one of a tracking error signal and a focus error signal reaches a predetermined threshold during each of the four recording operations, deciding whether the first and second data each have been recorded in the associated data recording location on said record medium, and determining one valid data among two or more originally identical data recorded in different locations on said medium based on a result of said detecting operation during recording the two or more identical data.

10. The method as set forth in claim 9, the method further comprising:

updating data address information recorded in a control area on the record medium to control a data address based on a result of said determining operation.

11. An information recording unit comprising:

a memory for storing data provided for recording, a record device for intermittently recording the data stored in said memory onto a recording medium, said record device recording the data in at least two different areas on said record medium, a valid-data decision device for determining whether the recorded data is valid, said valid-data decision device determining one valid data among the recorded data in the different areas, a vibration detection device for detecting a vibration applied to the unit, a first storage device for storing a first flag indicating the occurrence of a vibration in relation to a predetermined address when said vibration detection device has detected a vibration during a data recording operation at the predetermined address, and a second storage device for storing a second flag in relation to another predetermined address so as to indicate that said valid-data decision device has determined that desired data is not recorded at the another predetermined address on said record medium, wherein said valid-data decision device determines whether the data is valid according to said flags stored by said first and second storage devices.

12. An information recording unit comprising:

a memory for storing a data provided for recording, a record device for intermittently recording the data stored in said memory onto a recording medium, said record device recording the data in at least two different areas on said record medium, a valid-data decision device for determining whether the recorded data is valid, said valid-data decision device determining one valid data among the recorded data of the different areas, a servo condition detection device for detecting whether at least one of a tracking error signal and a focus error signal reaches a predetermined threshold, a record-data decision device for determine whether a desired data has been recorded on said record medium, a first device for storing a first flag indicating the occurrence of a vibration in relation to a predetermined address during a data recording operation at the predetermined address when said servo condition detection device has detected that said at least one error signal has reached the threshold, a second storage device for storing a second flag corresponding to a predetermined address so as to indicate that said record-data decision device has determined that data is correctly recorded at the predetermined address on said record medium, wherein valid-data decision device determines whether the data is valid based on said flags in said first and second storage devices.

* * * * *